United States Patent
Ito

(10) Patent No.: US 9,862,651 B2
(45) Date of Patent: Jan. 9, 2018

(54) HONEYCOMB STRUCTURE

(71) Applicant: NGK Insulators, Ltd., Nagoya (JP)

(72) Inventor: Mitsuhiro Ito, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 289 days.

(21) Appl. No.: 14/633,652

(22) Filed: Feb. 27, 2015

(65) Prior Publication Data
US 2015/0252703 A1 Sep. 10, 2015

(30) Foreign Application Priority Data

Mar. 4, 2014 (JP) .................. 2014-041376

(51) Int. Cl.
*B01D 46/24* (2006.01)
*C04B 38/00* (2006.01)
(Continued)

(52) U.S. Cl.
CPC ...... *C04B 38/0006* (2013.01); *B01D 46/2448* (2013.01); *C04B 28/24* (2013.01); *C04B 35/565* (2013.01); *C04B 37/005* (2013.01); *C04B 41/009* (2013.01); *C04B 41/5089* (2013.01); *C04B 41/85* (2013.01); *B01D 46/2418* (2013.01); *B01D 2046/2496* (2013.01); *B32B 2264/101* (2013.01); *B32B 2264/107* (2013.01); *C04B 2111/0081* (2013.01); *C04B 2111/00793* (2013.01); *C04B 2111/343* (2013.01); *C04B 2235/3234* (2013.01);
(Continued)

(58) Field of Classification Search
None
See application file for complete search history.

(56) References Cited

U.S. PATENT DOCUMENTS

| 2008/0138568 A1 | 6/2008 | Tomita et al. |
| 2008/0152863 A1 | 6/2008 | Tomita et al. |
| 2009/0041975 A1 | 2/2009 | Kodama et al. |

FOREIGN PATENT DOCUMENTS

| EP | 1 930 061 A2 | 6/2008 |
| EP | 2 008 985 A1 | 12/2008 |

(Continued)

OTHER PUBLICATIONS

European Search Report, European Application No. 15157403.5, dated Sep. 2; 2015 (8 pages).
(Continued)

*Primary Examiner* — David Sample
*Assistant Examiner* — Nicholas W Jordan
(74) *Attorney, Agent, or Firm* — Burr & Brown, PLLC

(57) ABSTRACT

A honeycomb structure has a plurality of pillar honeycomb segments with a porous partition wall that defines a plurality of cells extending from an inflow end face as one end face to an outflow end face as another end face and becoming channels for a fluid and a bonding layer that bonds side surfaces of the plurality of honeycomb segments one another, the bonding layer contains a plurality of plate-shaped particles, the plate-shaped particles are laminated in a thickness direction X of the bonding layer at a cross section of the bonding layer cut off to the thickness direction of the bonding layer, the number of particles α meets Expression: number of particles α>10, and the number of particles α and the number of particles β meet a relationship of Expression: (number of particles α/number of particles β)>3.

8 Claims, 3 Drawing Sheets

(51) Int. Cl.
  *C04B 28/24*    (2006.01)
  *C04B 35/565*   (2006.01)
  *C04B 37/00*    (2006.01)
  *C04B 41/85*    (2006.01)
  *C04B 41/00*    (2006.01)
  *C04B 41/50*    (2006.01)
  *C04B 111/00*   (2006.01)
  *C04B 111/34*   (2006.01)

(52) U.S. Cl.
  CPC ............ *C04B 2235/3418* (2013.01); *C04B 2235/3481* (2013.01); *C04B 2235/3826* (2013.01); *C04B 2235/3873* (2013.01); *C04B 2235/5292* (2013.01); *C04B 2237/062* (2013.01); *C04B 2237/08* (2013.01); *C04B 2237/09* (2013.01); *C04B 2237/341* (2013.01); *C04B 2237/343* (2013.01); *C04B 2237/346* (2013.01); *C04B 2237/365* (2013.01); *C04B 2237/368* (2013.01); *Y10T 428/24149* (2015.01)

(56) References Cited

FOREIGN PATENT DOCUMENTS

| | | |
|---|---|---|
| EP | 2 112 129 A1 | 10/2009 |
| EP | 2 116 520 A1 | 11/2009 |
| EP | 2 123 617 A1 | 11/2009 |
| EP | 2 138 475 A1 | 12/2009 |
| JP | 2008-179526 A | 8/2008 |
| WO | 2008/096851 A1 | 8/2008 |
| WO | 2008/1417611 A1 | 10/2008 |

OTHER PUBLICATIONS

Japanese Office Action (with English translation), Japanese Application No. 2014-041376, dated Jul. 25, 2017 (6 pages).

HONEYCOMB STRUCTURE

The present application is an application based on JP 2014-041376 filed on Mar. 4, 2014 with Japan Patent Office, the entire contents of which are incorporated herein by reference.

BACKGROUND OF THE INVENTION

Field of the Invention

The present invention relates to a honeycomb structure. More specifically, the present invention relates to the honeycomb structure where a honeycomb segment is less likely to be cracked even during regeneration of a filter and the honeycomb segment does not fall off.

Background Art

Conventionally, a filter has been used to capture and remove a particulate matter (particulate) contained in exhaust gas exhausted from, for example, a diesel engine, or to purify the exhaust gas with a catalyst.

This filter is constituted of a pillar honeycomb structure with a partition wall that defines a plurality of cells extending from one end face to the other end face and becoming channels for the exhaust gas. That is, the exhaust gas that flows in from the one end face to the inside of the honeycomb structure is purified by passing through the inside of the partition wall and the like.

As this honeycomb structure, there have been known honeycomb structures where, for example, a plurality of honeycomb segments are monolithically bonded with bonding layers (for example, see Patent Documents 1 and 2).

[Patent Document 1] WO2008/117611
[Patent Document 2] WO2008/096851

SUMMARY OF THE INVENTION

If the honeycomb structures disclosed in Patent Documents 1 and 2 are repeatedly heated and cooled by a regeneration process and the like, this possibly cracks the honeycomb segments, which constitute the honeycomb structure.

Specifically, a bonding layer may be cracked during regeneration of a filter. As a countermeasure to avoid the bonding layer to be cracked, a structure of preferentially cracking the honeycomb segment is employed. The bonding layer is avoided to be cracked due to a possibility of causing a problem of the honeycomb segment falling off by cracking the bonding layer.

Meanwhile, the crack generated at the honeycomb segment due to the regeneration of the filter causes a problem of degrade of trap performance of soot. To avoid such problem, the filter is appropriately regenerated.

However, since fuel that should be supplied to, for example, an engine is used for the regeneration of the filter, if the filter is regenerated many times, this results in degrade of fuel consumption. Therefore, a development of a honeycomb structure where a honeycomb segment is less likely to be cracked even during the regeneration of the filter and therefore the honeycomb segment does not fall off has been desperately desired.

The present invention has been developed in view of the above-mentioned problems, and an object thereof is to provide a honeycomb structure where the honeycomb segment is less likely to be cracked even during the regeneration of the filter and therefore the honeycomb segment does not fall off.

To solve the above-mentioned problems, according to the present invention, the following honeycomb structure is provided.

According to a first aspect of the present invention, a honeycomb structure has a plurality of honeycomb segments with a porous partition wall that defines a plurality of cells extending from an inflow end face as one end face to an outflow end face as another end face and becoming channels for a fluid; and a bonding layer that bonds side surfaces of the plurality of honeycomb segments one another, the bonding layer contains a plurality of plate-shaped particles, the plate-shaped particles are laminated in a thickness direction of the bonding layer at a cross section of the bonding layer cut off to the thickness direction of the bonding layer, and when assuming a longitudinal scanning line as a scanning line at a length of 1000 μm parallel to the thickness direction of the bonding layer at the cross section of the bonding layer cut off to the thickness direction of the bonding layer, and when assuming the number of plate-shaped particles that form an angle of 45° or more with the longitudinal scanning line is set as the number of particles $\alpha$ among the plate-shaped particles intersecting with the longitudinal scanning line, and a lateral scanning line is a scanning line at a length of 1000 μm perpendicular to the thickness direction of the bonding layer at the cross section, and when the number of plate-shaped particles that form an angle of 45° or more with the lateral scanning line is set as the number of particles $\beta$ among the plate-shaped particles intersecting with the lateral scanning line, the number of particles $\alpha$ meets Expression: number of particles $\alpha > 10$, and the number of particles $\alpha$ and the number of particles $\beta$ meet a relationship of Expression: (number of particles $\alpha$/number of particles $\beta) > 3$.

According to a second aspect of the present invention, the honeycomb structure according to the first aspect is provided, the plate-shaped particles in the bonding layer contains a particle having a thickness of 1 to 10 μm and a width of 40 to 500 μm at the cross section of the bonding layer cut off to the thickness direction of the bonding layer.

According to a third aspect of the present invention, the honeycomb structure according to the first or second aspects is provided, the plate-shaped particles in the bonding layer is constituted of at least one kind selected from the group consisting of mica, talc, boron nitride, and glass flake.

According to a fourth aspect of the present invention, the honeycomb structure according to any one of the first to third aspects is provided, the honeycomb segment is constituted of at least one kind selected from the group consisting of silicon carbide, alumina titanate, silicon nitride, and cordierite.

The honeycomb structure of the present invention has the bonding layer containing the plate-shaped particles laminated in the thickness direction of the bonding layer, the number of particles $\alpha$ meets Expression: the number of particles $\alpha > 10$, and the number of particles $\alpha$ and the number of particles $\beta$ meet the relationship of Expression: (the number of particles $\alpha$/the number of particles $\beta) > 3$. Accordingly, in the honeycomb structure of the present invention, the honeycomb segment is less likely to be cracked even during the regeneration of the filter and the honeycomb segment does not fall off.

DESCRIPTION OF THE PREFERRED EMBODIMENTS

Next, a mode for carrying out the present invention will be described in detail with reference to the drawings. It should be understood that the present invention is not limited to the following embodiments and that design change, improvement, and the like may be suitably added on the basis of ordinary knowledge of a person skilled in the art without departing from the gist of the present invention.

Figure 1:
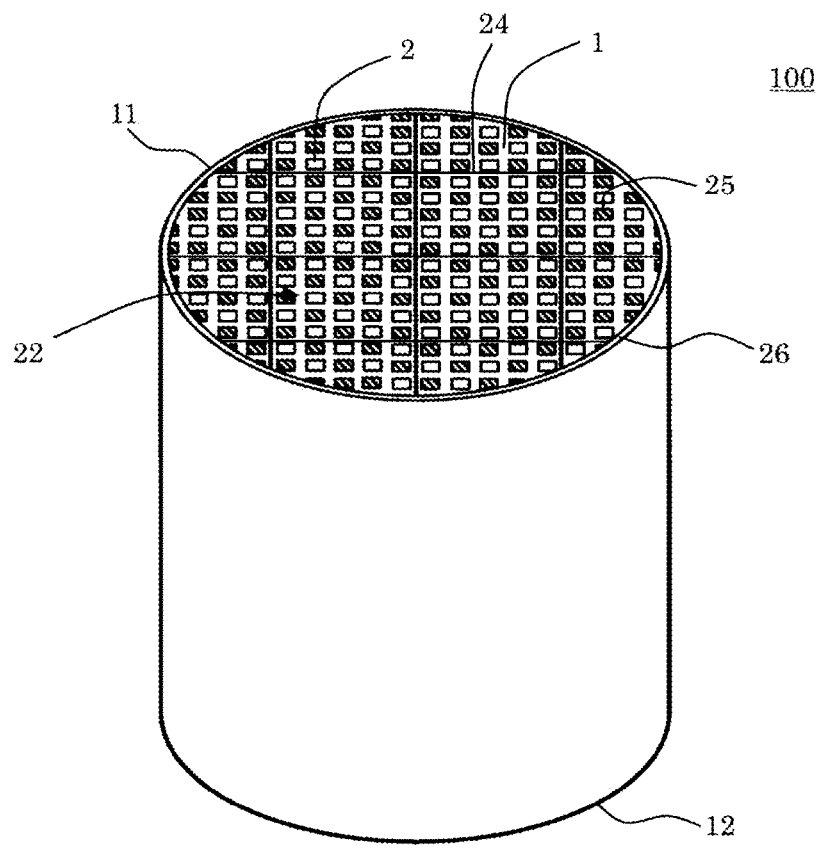
FIG. 1 is a perspective view schematically showing a honeycomb structure of one embodiment of the present invention.
Figure 2:
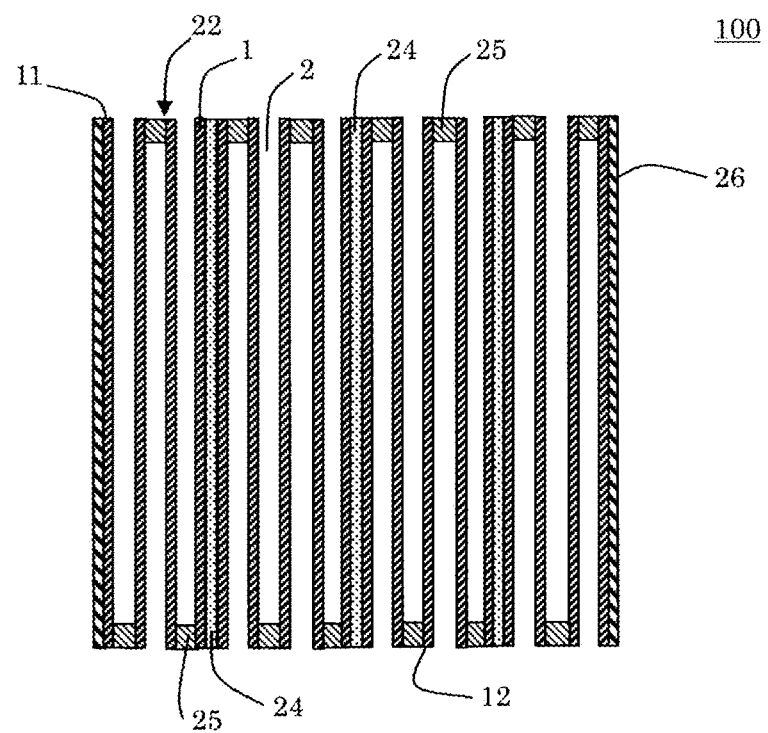
FIG. 2 is a cross-sectional view schematically showing a cross section parallel to a cell extending direction of the honeycomb structure of the one embodiment of the present invention.
Figure 3:
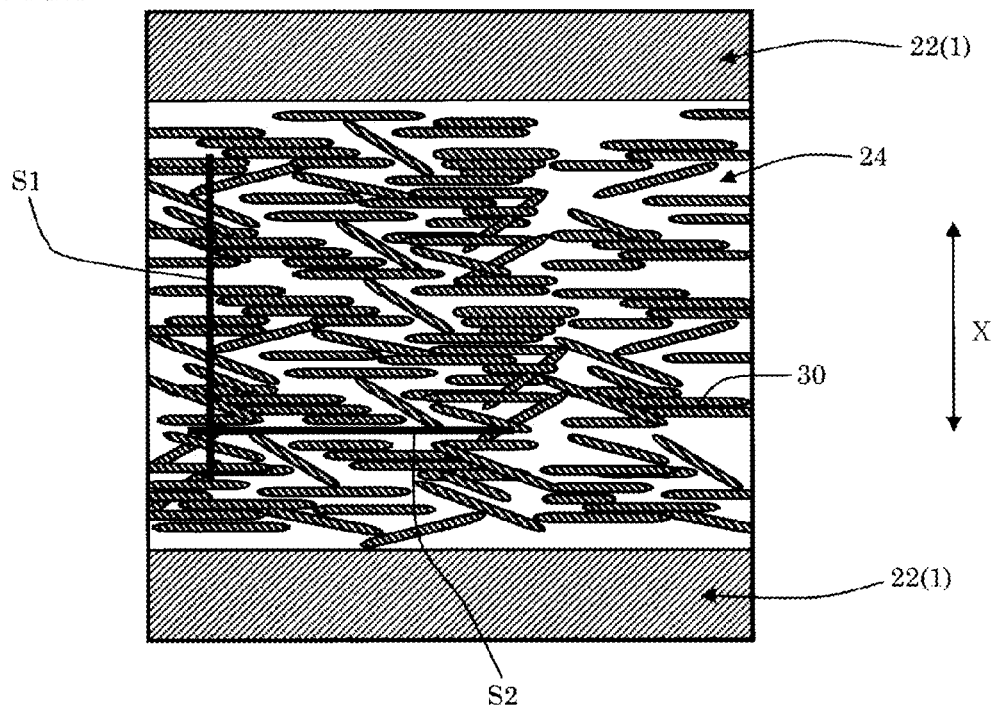
FIG. 3 is a cross-sectional view schematically showing an enlarged part of the honeycomb structure shown in FIG. 2.

(1) Honeycomb Structure:

A honeycomb structure of one embodiment of the present invention is a pillar honeycomb structure 100 as shown in FIG. 1 to FIG. 3. That is, the honeycomb structure 100 has a plurality of pillar honeycomb segments 22 and a bonding layer 24, which bonds side surfaces of the plurality of honeycomb segments 22 one another. The honeycomb segment 22 has a porous partition wall 1 that defines a plurality of cells 2 extending from an inflow end face 11 as one end face to an outflow end face 12 as the other end face and becoming channels for a fluid. The bonding layer 24 of the honeycomb structure 100 contains a plurality of plate-shaped particles 30. The plate-shaped particles 30 are laminated in a thickness direction X of the bonding layer 24 at a cross section of the bonding layer 24 (see FIG. 3) cut off to the thickness direction of the bonding layer 24. Assume a longitudinal scanning line S1 (see FIG. 3) as a scanning line at a length of 1000 μm parallel to the thickness direction of the bonding layer 24 at the cross section of the bonding layer 24 cut off to the thickness direction of the bonding layer 24. At this time, among the plate-shaped particles 30 intersecting with the longitudinal scanning line S1, the number of plate-shaped particles 30 that form an angle of 45° or more with the longitudinal scanning line S1 is set as the number of particles α. Further, assume that a lateral scanning line is a scanning line at a length of 1000 μm perpendicular to the thickness direction of the bonding layer 24 at the cross section (the cross section where the number of particles α is counted). At this time, among the plate-shaped particles 30 intersecting with a lateral scanning line S2 (see FIG. 3), the number of plate-shaped particles 30 that form an angle of 45° or more with the lateral scanning line S2 is set as the number of particles β. In this case, with the honeycomb structure 100, the number of particles α meets Expression: the number of particles α>10, and the number of particles α and the number of particles β meet the relationship of Expression: (the number of particles α/the number of particles β)>3. Although the honeycomb structure 100 has an outer circumference coating layer 26 at the outer periphery, this outer circumference coating layer 26 is not necessary.

FIG. 1 is a perspective view schematically showing a honeycomb structure of one embodiment of the present invention. FIG. 2 is a cross-sectional view schematically showing a cross section parallel to a cell extending direction of the honeycomb structure of the one embodiment of the present invention. FIG. 3 is a cross-sectional view schematically showing an enlarged part of the honeycomb structure shown in FIG. 2.

In this honeycomb structure 100, the plate-shaped particles 30 are laminated on the bonding layer 24 in the thickness direction X of the bonding layer 24, the number of particles α meets Expression: the number of particles α>10, and the number of particles α and the number of particles β meet the relationship of Expression: (the number of particles α/the number of particles β)>3. Accordingly, with the honeycomb structure 100, the honeycomb segment is less likely to be cracked even during the regeneration of the filter and therefore the honeycomb segment does not fall off.

That is, since in the honeycomb structure 100, the plate-shaped particles 30 are laminated as described above, that is, to meet the conditions, the bonding layer 24 can be induced to be cracked before the honeycomb segment 22 is cracked. That is, in the honeycomb structure of the present invention, the bonding layer is cracked preferentially. This allows retarding generation of a crack at the honeycomb segment. In other words, by causing the bonding layer to be preferentially cracked, stress generated at the honeycomb segment is reduced, allowing retarding the generation of a crack at the honeycomb segment. That is, when the stress is generated, the lamination of the particles in the thickness direction of the bonding layer first applies the stress in a direction of tearing up the bonding layer, resulting in a crack at the bonding layer. As described above, with the honeycomb structure of the present invention, the honeycomb segment is less likely to be cracked. Consequently, the honeycomb structure of the present invention increases an amount of trappable soot.

Further, the honeycomb structure of the present invention focuses on preferentially cracking the bonding layer to achieve an increase in the amount of trappable soot. This allows further increasing the amount of trappable soot by the combination use with the conventionally-known technique that increases the amount of trappable soot by improving a property of the honeycomb segment.

Since the honeycomb structure of the present invention can increase the amount of trappable soot as described above, this allows extending timing of regenerating the filter for, for example, a diesel engine. Consequently, the use of the honeycomb structure of the present invention improves fuel consumption.

The bonding layer laminates the plate-shaped particles so as to meet the conditions. Accordingly, with the honeycomb structure of the present invention, even if the bonding layer is cracked along an arranging direction (direction perpendicular to the thickness direction of the bonding layer) of the plate-shaped particles, the honeycomb segment is less likely to fall off. That is, after the crack is generated as described above, even if external force is applied to the honeycomb segment in a direction (namely, a cell extending direction) of the honeycomb segment falling off, the following method prevents the honeycomb segment from falling off. That is, although thermal stress partially separates the laminated plate-shaped particles and generates the crack, the plate-shaped particles exposed at the crack extend along the crack and are present like so-called prickles. Application of the external force engages the prickles with one another to restrict the honeycomb segment to move in the cell extending direction of the honeycomb segment. This prevents the honeycomb segment from falling off.

With the honeycomb structure of the present invention, even if the bonding layer is cracked, the generated crack usually develops in a direction that the stress is easily released. Specifically, the stress is easily developed to an end face on an outlet side open to the space. That is, a part at which the stress during the regeneration of the filter becomes the maximum is the end on the outlet side when the soot is accumulated, therefore, with the honeycomb structure of the present invention, the end on this outlet side is likely to be cracked. Meanwhile, stress at an end on an inlet side is smaller than the end on the outlet side, therefore, the end on the inlet side is less likely to be cracked. Accordingly, although the crack generated at the end on the outlet side is likely to be developed in a radial direction of the honeycomb structure, the crack is less likely to be developed to an overall length direction of the honeycomb structure. Accordingly, the crack causing the honeycomb segment to fall off is less likely to be generated. From this point as well, the honeycomb structure of the present invention features strength of holding and sticking the honeycomb segments, causing the honeycomb segment to be less likely to fall off.

(1-1) Bonding Layer:

As described above, the bonding layer contains the plurality of plate-shaped particles. These plate-shaped particles mean particles meeting the following conditions A and B.

Condition A: at the cross section (cross section in the thickness direction) of the bonding layer cut off to the thickness direction of the bonding layer, the thickness is 1 to 10 μm and a width is 40 to 500 μm.

Condition B: at the cross section cut off to be perpendicular to the cross section in the thickness direction, a length in a direction perpendicular to the thickness direction of the bonding layer is 40 to 500 μm.

The thickness, the width, and the length are average values of when selecting and measuring a plurality of any regions.

The plate-shaped particles in the bonding layer preferably contains particles (first particles) having the thickness of 1 to 10 μm and the width of 40 to 500 μm at the cross section of the bonding layer cut off to the thickness direction of the bonding layer. Containing such first particles causes the plate-shaped particles to be easily laminated in the thickness direction of the bonding layer.

Further, the first particles preferably have a length of 40 to 500 μm in the direction perpendicular to the thickness direction of the bonding layer at the cross section cut off to be perpendicular to the cross section in the thickness direction.

The first particles preferably occupy 70 to 100% of "the plate-shaped particles that form an angle of 45° or more with the longitudinal scanning line among the plate-shaped particles intersecting with the longitudinal scanning line." Containing the first particle at this proportion laminates the plate-shaped particles in the thickness direction of the bonding layer, causing the honeycomb segment to be less likely to be cracked.

The plurality of longitudinal scanning lines S1 are drawn at any given positions, and the number of particles α is an average value found by counting the number of plate-shaped particles 30 forming the angle of 45° or more with each longitudinal scanning line S1 among the plate-shaped particles 30 intersecting with these longitudinal scanning lines S1. The plurality of lateral scanning lines S2 are drawn at any given positions, and the number of particles β is an average value found by counting the number of plate-shaped particles 30 forming the angle of 45° or more with each lateral scanning line S2 among the plate-shaped particles 30 intersecting with these lateral scanning lines S2.

An angle formed with the scanning lines in the respective directions (longitudinal scanning line and lateral scanning line) is an acute angle among angles formed by the plate-shaped particles and the scanning lines in the respective directions.

"The plate-shaped particles that form an angle of 45° or more with the longitudinal scanning line" means the following plate-shaped particles. An intersection point of the longitudinal scanning line and the respective plate-shaped particles at the cross section of the bonding layer cut off to the thickness direction of the bonding layer is referred to as a first angle reference point. Assume a first imaginary straight line, a straight line passing through this first angle reference point and parallel to a plate-shaped particles extending direction. At this time, the plate-shaped particles where the longitudinal scanning line and the first imaginary straight line form the angle of 45° or more is referred to as "plate-shaped particles that form an angle of 45° or more with the longitudinal scanning line."

Similarly, "the plate-shaped particles that form the angle of 45° or more with the lateral scanning line among the plate-shaped particles intersecting with the lateral scanning line" means the following plate-shaped particles. An intersection point of the lateral scanning line and the respective plate-shaped particles at the cross section of the bonding layer cut off to the thickness direction of the bonding layer is referred to as a second angle reference point. Assume a second imaginary straight line, a straight line passing through this second angle reference point and parallel to the plate-shaped particles extending direction. At this time, the plate-shaped particles where the lateral scanning line and the second imaginary straight line form the angle of 45° or more is referred to as "plate-shaped particles that form an angle of 45° or more with the lateral scanning line."

Values of the number of particles α and (the number of particles α/the number of particles β) preferably meet Expression: the number of particles α>25 and meet the relationship of Expression: (the number of particles α/the number of particles β)>5; and further preferably meet Expression: the number of particles α>50 and meet the relationship of Expression: (the number of particles α/the number of particles β)>6. By meeting these conditions, even during the regeneration of filter (honeycomb structure), the honeycomb segment is further less likely to be cracked, thus further preventing the honeycomb segment from falling off.

The plate-shaped particles are preferably at least one kind of a material selected from the group consisting of mica, talc, boron nitride, and glass flake. Because these materials are minerals featuring excellent thermal resistance and excellent chemical resistance, the bonding layer is excellent in the thermal resistance and the chemical resistance.

The thickness of the bonding layer is preferable to be 100 to 3000 μm and further preferable to be 500 to 1500 μm. This allows further reducing the crack with more certainty. The thickness of the bonding layer is a thickness at the thickest part of the layer.

(1-2) Honeycomb Segment:

The honeycomb segment is preferably constituted of at least one kind selected from the group consisting of silicon carbide, alumina titanate, silicon nitride, and cordierite. Because these materials are minerals featuring excellent thermal resistance and excellent chemical resistance, the bonding layer is excellent in the thermal resistance and the chemical resistance.

A porosity of the partition wall 1 of the honeycomb segment 22 is preferably from 35 to 60%, and further preferably from 45 to 55%. The porosity of less than 35% may increase a deformation at the firing. The porosity of more than 60% may degrade the strength of the honeycomb structure. The porosity is a value measured with a mercury porosimeter.

An average pore diameter of the partition wall 1 of the honeycomb segment 22 is preferably from 2 to 30 μm and further preferably from 4 to 20 μm. The average pore diameter of less than 2 μm may increase the pressure loss after coating (applying) the catalyst. The average pore diameter of more than 30 μm may degrade the trap performance. The average pore diameter is a value measured with the mercury porosimeter.

The thickness of the partition wall 1 of the honeycomb segment 22 is preferable to be 100 to 450 μm and further preferable to be 150 to 320 μm. The thickness of the partition wall 1 of less than 100 μm may result in insufficient strength as a structure. The thickness of the partition wall 1 of more than 450 μm may increase the pressure loss.

A cell density of the honeycomb segment 22 is preferable to be 15 to 60 pieces/cm$^2$ and further preferable to be 30 to 50 pieces/cm$^2$. The cell density of less than 15 pieces/cm$^2$ may result in insufficient strength as a structure. The cell density of more than 60 pieces/cm$^2$ may increase the pressure loss.

With the honeycomb segment 22, the shape of the cells 2 at the cross section perpendicular to the cell 2 extending direction is preferable to be a quadrangular shape, a hexagonal shape, an octagonal shape, or a combination of these shapes. Thus forming the shape of the cells decreases the pressure loss when exhaust gas is flown to the honeycomb structure 100.

The shape of the honeycomb segment 22 is not especially limited as long as the side surfaces of the plurality of honeycomb segments can be bonded with the bonding layers one another. The shape of the honeycomb segment 22 may differ between one honeycomb segment and other honeycomb segments or may be the same. As the shape of the honeycomb segment 22, specifically, the shape of the cross section perpendicular to the cell extending direction can be a polygonal (quadrangular shape, pentagonal shape, hexagonal shape, heptagonal shape, octagonal shape, and the like) pillar.

The number of honeycomb segments 22 can be appropriately set to, for example, 4 to 100 pieces. As a constitution of combining the honeycomb segments 22, for example, four pieces vertical×four pieces lateral or five pieces vertical×five pieces lateral can be employed.

The honeycomb segment 22 has plugging portions 25 disposed at ends on the inflow end face 11 side of predetermined cells among the plurality of cells 2 and also disposed at ends on the outflow end face 12 side of the residual cells. These plugging portions 25 are arranged at the respective inflow end face 11 and outflow end face 12 such that the predetermined cells and the residual cells are alternately arranged, forming a so-called checkered-pattern.

When the honeycomb segment has the plugging portion, the material of the plugging portion is also preferably the same material as the material of the honeycomb segment.

The isostatic strength of the honeycomb structure 100 is preferable to be 1 MPa or more and further preferable to be 3 MPa or more. The isostatic strength preferably has a larger value. However, when a material, a structure, and the like of the honeycomb structure 100 are taken into consideration, an upper limit is approximately 6 MPa. When the isostatic strength is less than 1 MPa, the honeycomb structure may be easily damaged during use of the honeycomb structure as the catalyst carrier and the like. The isostatic strength is a value measured under application of a hydrostatic pressure on the honeycomb structure in water.

There is not any special restriction on a shape of the honeycomb structure 100, and examples of the shape can include a cylindrical shape with a round bottom surface (cylindrical shape), a cylindrical shape with an oval bottom surface (elliptic cylinder shape), and a cylindrical shape with a polygonal bottom surface (quadrangular shape, pentagonal shape, hexagonal shape, heptagonal shape, octagonal shape, and the like) (prismatic pillar shape).

Moreover, as to a size of the honeycomb structure 100, an area of the bottom surface is preferably from 2000 to 100000 mm$^2$, and further preferably from 4000 to 10000 mm$^2$. Furthermore, a length of the honeycomb bonded assembly 10 (honeycomb structure 100) in the cell extending direction is preferably from 50 to 400 mm, and further preferably from 75 to 255 mm.

(2) Method for Manufacturing Honeycomb Structure:

Next, the method for manufacturing the honeycomb structure of the present invention can employ the following method. First, a honeycomb formed body fabrication process that fabricates a plurality of pillar honeycomb segments with a porous partition wall defining a plurality of cells extending from the inflow end face as one end face to the outflow end face as the other end face and becoming channels for a fluid is performed. Next, a honeycomb segment bonding process that applies a bonding material containing the plate-shaped particles to side surfaces of the plurality of obtained honeycomb segments to form a bonding membrane, and then applies external pressure at 0.1 to 0.6 MPa to the bonding membrane in the thickness direction of the bonding membrane to bond the honeycomb segments is performed. Thus, the honeycomb structure of the present invention can be manufactured.

In the honeycomb segment bonding process, when applying the bonding material over the honeycomb segments, the bonding material is suctioned (pumped) with suction means, such as a pump (mohno-pump and the like), from a storage tank storing the bonding material to discharge and apply the bonding material. This processes orient the plate-shaped particles in the bonding material (that is, the plate-shaped particles are oriented to the least resistance (the plate-shaped particles are laminated)). Then, the bonding material containing the oriented plate-shaped particles is applied, causing the plate-shaped particles in the bonding membrane to be laminated. To the suction means, a supply passage (such as a hose) is usually coupled. Further, a subsequent operation applies the external pressure in the thickness direction of the bonding membrane to the applied bonding material, making the bonding material have a smaller resistance (that is, the plate-shaped particles are laminated).

In the case where the honeycomb structure has the plugging portion, a plugging process that forms the plugging portions at each honeycomb segment before being bonded with the bonding material can be performed. The plugging portions may be formed after bonding the honeycomb segments. To form the honeycomb structure into a desired shape, after bonding the honeycomb segments to obtain a honeycomb bonded assembly, a grinding process that grinds an outer peripheral portion of this honeycomb bonded assembly can be performed. After this grinding process, a circumferential wall formation process that applies an outer circumference coating material to the outer peripheral surface of the grinded honeycomb bonded assembly to form the circumferential wall can be performed.

(2-1) Fabrication of Honeycomb Formed Body:

First, the honeycomb formed body is fabricated by the following method. A honeycomb forming raw material is prepared by mixing a binder, a surfactant, a pore former, water, and the like. This honeycomb forming raw material preferably contains at least one kind selected from the group consisting of the silicon carbide, the alumina titanate, the silicon nitride, and the cordierite. This honeycomb forming raw material also preferably contains a cordierite forming raw material, which becomes the cordierite after being fired.

Next, the honeycomb forming raw material is kneaded to form a kneaded material. There is not any special restriction on a method of kneading the honeycomb forming raw material to form the kneaded material, and an example of the method can be a method in which a kneader, a vacuum pugmill, and the like is used.

Next, the kneaded material is extruded to fabricate a honeycomb formed body. The honeycomb formed body has a structure that has the partition wall defining the plurality of cells that become channels for a fluid.

Next, the obtained honeycomb formed body is preferably dried. The honeycomb formed body after drying may be referred to as a "honeycomb dried body." There is not any special restriction on a drying method. The honeycomb formed body may be degreased after the drying.

The honeycomb formed body (when dried, the honeycomb dried body) is preferably fired (obtains a honeycomb fired body). As a firing condition, heating is preferably performed at 1400 to 1500° C. in an inert atmosphere of argon and the like for 1 to 20 hours. Moreover, after the firing, an oxidation treatment is preferably performed at 1200 to 1350° C. for one to ten hours. Thus, the oxidation treatment improves durability of the honeycomb structure.

Thus, a plurality of honeycomb formed bodies (honeycomb dried bodies or honeycomb fired bodies) are fabricated and are referred to as "honeycomb segments."

(2-2) Bonding of Honeycomb Segments

Next, the honeycomb bonded assembly is fabricated. First, a bonding material for forming the bonding layer, which bonds, the honeycomb segments, is fabricated.

The bonding material can be prepared by kneading the plate-shaped particles, inorganic particles, the binder, and a dispersing agent. As the plate-shaped particles, using at least one kind of a material selected from the group consisting of mica, talc, boron nitride, and glass flake is preferable.

The average value of the size of the plate-shaped particles is preferably a vertical of 40 to 500 μm, a lateral of 40 to 500 μm, and a thickness of 1 to 10 μm. The use of the plate-shaped particles with this size preferentially cracks the bonding layer (the bonding layer prior to the honeycomb segment), thus the honeycomb segment is less likely to be cracked. That is, this allows preventing the honeycomb segment from cracking before cracking the bonding layer.

The content of the plate-shaped particles is preferable to be 15 to 70 mass % with respect to the solid content of the bonding material and further preferable to be 30 to 45 mass %. Designing the content of the plate-shaped particles within this range easily laminates the plate-shaped particles in the thickness direction of the bonding layer.

The viscosity of the bonding material is preferable to be 200 to 500 Pa·s, and further preferable to be 300 to 400 Pa·s. Designing the viscosity of the bonding material within this range forms the bonding material of being easily applied.

After applying the fabricated bonding material to the respective side surfaces of the plurality of honeycomb segments, pressure in the thickness direction of the bonding layer is applied to the honeycomb segments (honeycomb dried bodies) to be bonded. The applied pressure can be 0.1 to 0.6 MPa. Thus, the honeycomb segments are bonded to fabricate the honeycomb bonded assembly.

After applying the bonding material, drying the honeycomb bonded assembly is preferable. This drying condition is preferable to be at 50 to 200° C.

Next, to remove the binder and the like in the bonding material from the honeycomb bonded assembly after the drying, the honeycomb bonded assembly is preferably calcined. The calcination is preferably performed under the air atmosphere at 400 to 500° C. for 0.5 to 20 hours.

The outer periphery portion of the obtained honeycomb bonded assembly may be grinded such that the outer circumference shape of the honeycomb bonded assembly has a predetermined shape.

EXAMPLES

Hereinafter, the present invention will further specifically be described with examples, but the present invention is not limited to these examples.

Example 1

SiC powder and metal Si powder were mixed at a mass ratio of 80:20. A starch and foamable resin were added to thus mixed powder as a pore former. Further, the methylcellulose, the hydroxypropoxylmethyl cellulose, the surfactant, and water were added to fabricate plastic kneaded material.

Next, the obtained kneaded material was extruded to a honeycomb shape, thus obtaining a honeycomb formed body. Next, the obtained honeycomb formed body was dried at 120° C., thus obtaining a honeycomb dried body (honeycomb segment formed body).

In this honeycomb segment formed body, one end of predetermined cells and the other end of the residual cells were sealed such that both end faces each had the check pattern, thus forming plugging portions. That is, the adjacent cells were sealed so as to be sealed at the ends on the opposite side from one another. As a plugging material for forming the plugging portion, the material similar to the honeycomb segment raw material was used. Then, after drying the honeycomb segment formed body (after obtaining the honeycomb dried body), the honeycomb segment formed body was degreased at 400° C. in air atmosphere. Afterwards, the honeycomb segment formed body was fired under the Ar inert atmosphere at 1450° C., and SiC crystal particles were combined with Si. Thus, the honeycomb segment (honeycomb fired body) with a porous structure was obtained. This honeycomb segments were fabricated by 500 pieces.

Next, mica of 20 parts by mass, SiC of 45 parts by mass, colloidal silica of 35 parts by mass, and as a superaddition, carboxymethylcellulose of 1 parts by mass, porinon of 1 parts by mass, foamable resin of 1 parts by mass, and water of 25 parts by mass were kneaded with a mixer, thus preparing a paste-like bonding material. As the plate-shaped particles, the mica was used.

Next, the bonding materials were applied over the side surfaces of the respective honeycomb fired bodies, and among 500 pieces of the fabricated honeycomb fired bodies, 16 pieces of the honeycomb fired bodies were bonded to one another, thus obtaining the honeycomb bonded assemblies formed into a quadrangular prism of four pieces vertical× four pieces lateral. The bonding material was applied over the side surfaces of the honeycomb fired bodies by pumping the bonding material stored in the storage tank with the mohno-pump and supplying the bonding material from a distal end of a hose coupled to the mohno-pump to the side surfaces of the honeycomb fired bodies. When bonding the honeycomb fired bodies to one another, pressure at 0.05 MPa was applied on the honeycomb fired bodies to be bonded. Then, the honeycomb fired bodies were dried at 140° C. for two hours, thus obtaining the honeycomb bonded assembly.

Afterwards, the outer periphery portion of the processed quadrangular prism-shaped honeycomb bonded assembly was grinded such that the honeycomb bonded assembly became a pillar shape.

Next, the mica of 20 parts by mass, the SiC of 45 parts by mass, the colloidal silica of 35 parts by mass, as the superaddition, the carboxymethylcellulose of 1 parts by mass, the portion of 1 parts by mass, the foamable resin of 1 parts by mass, and water of 25 parts by mass were kneaded with the mixer, thus preparing a paste-like outer circumference coating material. The prepared outer circumference coating material was applied over the outer peripheral surface of the "grinded honeycomb bonded assembly" with the spatula. Then, the outer circumference coating material was dried at 700° C. for two hours, thus obtaining the honeycomb structure.

Figure 4A:
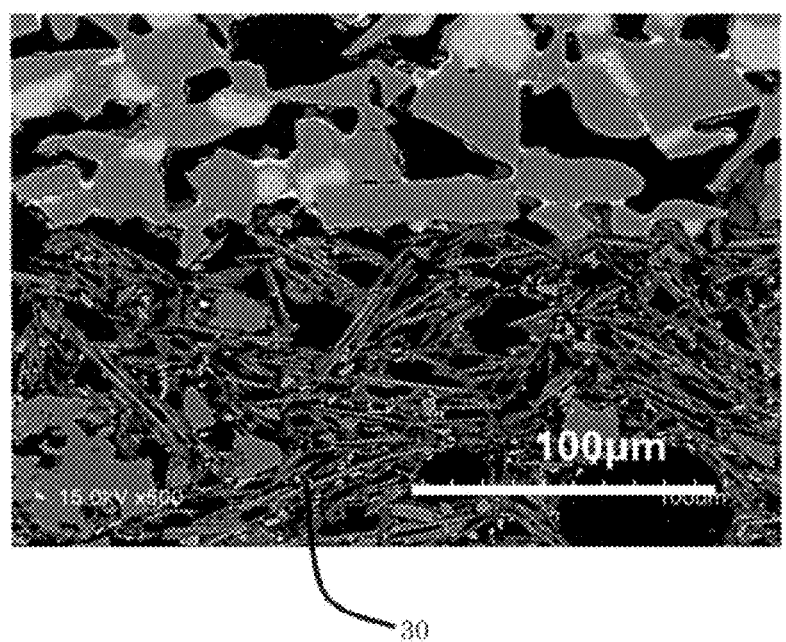
FIG. 4A is a photograph showing an enlarged part of a bonding layer of the honeycomb structure of the one embodiment of the present invention.
Figure 4B:
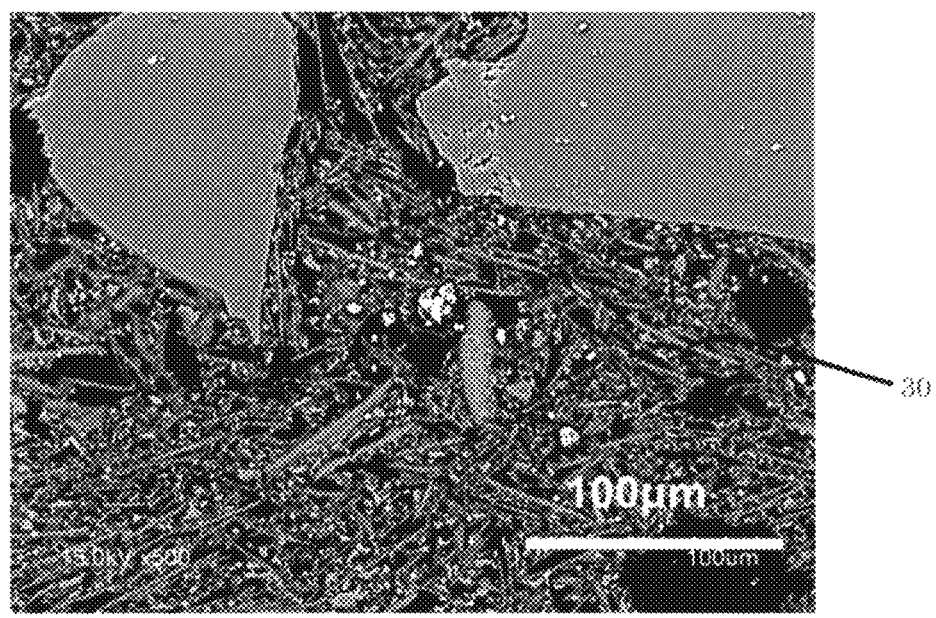
FIG. 4B is a photograph showing another enlarged part of the bonding layer of the honeycomb structure of the one embodiment of the present invention.

The thickness of the bonding layer of the obtained honeycomb structure was 1.0 mm. At the bonding layer of the honeycomb structure, the plate-shaped particles were laminated in the thickness direction of the bonding layer at the cross section of the bonding layer cut off to the thickness direction of the bonding layer (see FIG. 4A and FIG. 4B). More specifically, the number of particles α of the plate-shaped particles was 112 pieces, the number of particles β was 12 pieces, and the value of (the number of particles α/the number of particles β) was 9.3. The results are shown in Table 1. FIG. 4A is a photograph showing an enlarged part of the bonding layer of the honeycomb structure of the one embodiment of the present invention. FIG. 4B is a photograph showing another enlarged part of the bonding layer of the honeycomb structure of the one embodiment of the present invention. FIG. 4A and FIG. 4B enlarge different parts of the bonding layer at different magnifications.

Assume a longitudinal scanning line as a scanning line at a length of 1000 μm parallel to the thickness direction of the bonding layer at the cross section of the bonding layer cut off to the thickness direction of the bonding layer. Among the particles intersecting with the longitudinal scanning line, the number of particles that form an angle of 45° or more with the longitudinal scanning line was set as the number of particles α. Further, assume that a lateral scanning line is a scanning line at a length of 1000 μm perpendicular to the thickness direction of the bonding layer at the cross section of the bonding layer cut off to the thickness direction of the bonding layer. Among the particles intersecting with the lateral scanning line, the number of particles that form an angle of 45° or more with the lateral scanning line was set as the number of particles β. The magnification of a microscope when counting the number of particles was 500 powers (see FIG. 4A and FIG. 4B).

The plate-shaped particles met conditions of the thickness being 40 to 500 μm and the width being 1 to 10 μm at the cross section of the bonding layer cut off to in the thickness direction of the bonding layer. That is, particles meeting the above conditions were set as the "plate-shaped particles."

The pore diameter of the partition wall of the honeycomb structure was 11 μm and the porosity was 41%. The average pore diameter and the porosity are values measured with the mercury porosimeter. The thickness of the partition wall of the honeycomb structure was 300 μm, and the cell density was 46 cells/cm$^2$. The size of the honeycomb segment was vertical 36 mm×width 36 mm×lateral 152 mm, and the thickness of the bonding layer was 1.0 mm. The bottom surface of the honeycomb structure was a circular shape at a diameter (outer diameter) of 144 mm, and the length of the honeycomb structure in the cell extending direction was 152 mm. The cells at the cross section perpendicular to the cell extending direction of the honeycomb structure have the combination of the quadrangular shape and the octagonal shape. That is, the honeycomb structure of this example had the quadrangular-shaped cells and the octagonal-shaped cells alternately disposed to one another.

The following evaluations were conducted on the obtained honeycomb structures. The results are shown in Table 1.

(Maximum Soot Deposition Temperature (° C.))

The "Maximum soot deposition temperature" was measured as follows. A predetermined amount of particulate matter (PM) was deposited on a fabricated honeycomb filter (honeycomb structure) on an engine bench equipped with a 2.2-L diesel engine operated. Then, a regeneration process (process using post-injection to burn the PM) was performed to increase a temperature of gas (inlet gas) flown in a honeycomb filter. When pressure loss (pressure loss at the inlet side and the outlet side of the gas) measured in front and in the rear of the honeycomb filter began to decrease, post-injection was stopped, and the engine was switched to be idled. Then, the amount of PM deposition before the regeneration process was gradually increased, and the same test was repeatedly conducted until the honeycomb filter was cracked. At this time, a temperature of a center segment near the end face on the outlet side of the exhaust gas of the DPF was measured with a thermocouple. The center segment is a honeycomb segment other than the outer periphery segment, which is a honeycomb segment constituting the outer peripheral surface of the honeycomb filter. A maximum temperature inside the honeycomb filter when the honeycomb filter is not cracked was referred to as the "Maximum soot deposition temperature." In the respective evaluations, the presence/absence of the crack was confirmed by visual check.

(Maximum Soot Deposition Temperature Improvement Rate (%))

The "Maximum soot deposition temperature improvement rate" was calculated. The "Maximum soot deposition temperature improvement rate" means an improvement rate when setting a honeycomb structure of comparative example that uses a filter with the same honeycomb substrate and does not contain the plate-shaped particles in the bonding layer as 100% (criterion). In Comparative Examples 2 to 4 and Examples 1 to 12, the "Maximum soot deposition temperature improvement rate" was calculated setting Comparative Example 1 as a criterion. In Example 13, the improvement rate was calculated setting Comparative Example 5 as a criterion. In Example 14, the improvement rate was calculated setting Comparative Example 6 as a criterion. In Example 15, the improvement rate was calculated setting Comparative Example 7 as a criterion. If the "Maximum soot deposition temperature improvement rate" is 0% or less, the honeycomb segments, which constitute the honeycomb bonded assembly, are cracked. If the "Maximum soot deposition temperature improvement rate" is more than 0% to less than 1%, an effect of reducing the crack at the honeycomb segments, which constitute the honeycomb bonded assembly, can be confirmed slightly, not remarkably, though. When the "Maximum soot deposition temperature improvement rate" is 1% or more to less than 5%, it can be determined that "the crack at the honeycomb segments constituting the honeycomb bonded assembly can be reduced." Further, in the case of 5% or more, it can be determined that "the crack at the honeycomb segments constituting the honeycomb bonded assembly can be reduced with more further certainty."

(Falling Off of Honeycomb Segment)

Regarding the "falling off of honeycomb segment", after the test, pressure at 1100 N was applied to the honeycomb segments and then it was confirmed that the honeycomb segment did not fall off from the honeycomb structure.

the honeycomb segment falls off from the honeycomb structure or not was confirmed.

From Table 1, it can be seen that the honeycomb structures of Examples 1 to 15 exhibit high "Maximum soot deposition temperature (° C.)" and "Maximum soot deposition temperature improvement rate (%)", and the honeycomb segments were less likely to be cracked even during the regeneration of the filter. With the honeycomb structures of Examples 1 to 15, the honeycomb segment did not fall off.

The honeycomb structure of the present invention can be preferably used as a filter for purifying exhaust gas from, for example, an automobile.

DESCRIPTION OF REFERENCE NUMERALS

1: partition wall, 2: cell, 11: inflow end face, 12: outflow end face, 22: honeycomb segment, 24: bonding layer, 25:

TABLE 1

| | Material of honeycomb segment | Plate-shaped particles Kind | Plate-shaped particles parts by mass | Number of particles α (piece) | Number of particles β (piece) | Number of particles α/ Number of particles β | Maximum soot deposition temperature (° C.) | Maximum soot deposition temperature improvement rate (%) |
|---|---|---|---|---|---|---|---|---|
| Com. Ex 1 | SiC | Alumina silicate fiber | 5 | 5 | 3 | 1.7 | 1030 | 0 |
| Com. Ex 2 | SiC | Alumina thick diameter fiber | 5 | 5 | 1 | 5.0 | 1007 | −3 |
| Com. Ex 3 | SiC | Bio-soluble fiber | 35 | 8 | 5 | 1.6 | 1017 | −2 |
| Com. Ex 4 | SiC | Alumina silicate fiber | 20 | 20 | 12 | 1.7 | 1030 | 0 |
| Example 1 | SiC | Mica | 20 | 112 | 12 | 9.3 | 1130 | 10 |
| Example 2 | SiC | Mica | 22 | 137 | 25 | 5.5 | 1130 | 10 |
| Example 3 | SiC | Mica | 22 | 87 | 25 | 3.5 | 1130 | 10 |
| Example 4 | SiC | Mica | 5 | 25 | 3 | 8.8 | 1130 | 10 |
| Example 5 | SiC | Mica | 5 | 31 | 5 | 6.2 | 1130 | 10 |
| Example 6 | SiC | Mica | 5 | 19 | 5 | 3.8 | 1130 | 10 |
| Example 7 | SiC | Calcined mica | 22 | 112 | 12 | 9.3 | 1110 | 8 |
| Example 8 | SiC | Calcined mica | 22 | 137 | 25 | 5.5 | 1110 | 8 |
| Example 9 | SiC | Calcined mica | 22 | 87 | 25 | 3.5 | 1110 | 8 |
| Example 10 | SiC | Calcined mica | 5 | 25 | 3 | 8.3 | 1110 | 8 |
| Example 11 | SiC | Calcined mica | 5 | 31 | 5 | 6.2 | 1110 | 8 |
| Example 12 | SiC | Calcined mica | 5 | 19 | 5 | 3.8 | 1110 | 8 |
| Com. Ex 5 | Re—SiC | Bio-soluble fiber | 35 | 8 | 4 | 2.0 | 1040 | 0 |
| Example 13 | Re—SiC | Calcined mica | 22 | 87 | 25 | 3.5 | 1134 | 9 |
| Com. Ex 6 | Cd | Alumina silicate fiber | 2 | 2 | 1 | 2.0 | 960 | 0 |
| Example 14 | Cd | Calcined mica | 22 | 87 | 25 | 3.5 | 1050 | 9 |
| Com. Ex 7 | AT | Alumina silicate fiber | 2 | 2 | 1 | 2.0 | 1050 | 0 |
| Example 15 | AT | Calcined mica | 22 | 87 | 25 | 3.5 | 1150 | 10 |

In Table 1, the "Alumina silicate fiber" indicates a fiber-like substance made of alumina silicate whose representative dimensions are: length of approximately 300 μm and a thickness of 3 μm or less. The "Alumina thick diameter fiber" indicates a fiber-like substance made of alumina whose representative dimensions are: length of approximately 300 μm and the thickness of more than 3 μm to 6 μm or less. The "Bio-soluble fiber" indicates a fiber-like substance made of calcia silicate whose representative dimensions are: length of approximately 300 μm and the thickness of 3 μm or less. "Cd" indicates the cordierite. "AT" indicates the alumina titanate. "Re-SiC" indicates recrystallized SiC.

Examples 2 to 15 and Comparative Examples 1 to 7

The respective conditions were changed as shown in Table 1, otherwise, the honeycomb structures were fabricated similar to Example 1. Similar to the case of Example 1, the fabricated honeycomb structures were evaluated on the respective "Maximum soot deposition temperature (° C.)" and "Maximum soot deposition temperature improvement rate (%)." The results are shown in Table 1. Whether plugging portion, 26: outer circumference coating layer, 30: plate-shaped particle, 100: honeycomb structure, S1: longitudinal scanning line, S2: lateral scanning line, X: thickness direction of bonding layer

What is claimed is:

1. A honeycomb structure, comprising:
a plurality of honeycomb segments with a porous partition wall that defines a plurality of cells extending from an inflow end face as one end face to an outflow end face as another end face and becoming channels for a fluid; and
a bonding layer that bonds side surfaces of the plurality of honeycomb segments to one another, wherein
the bonding layer contains a plurality of plate-shaped particles,
the plate-shaped particles are laminated in a thickness direction of the bonding layer at a cross section of the bonding layer that is perpendicular to the thickness direction of the bonding layer, and
when assuming a longitudinal scanning line as a scanning line at a length of 1000 μm parallel to the thickness direction of the bonding layer at the cross section of the bonding layer that is perpendicular to the thickness direction of the bonding layer, when assuming that the number of plate-shaped particles that form an angle of 45° or more with the longitudinal scanning line is set as the number of particles α among the plate-shaped particles intersecting with the longitudinal scanning line, and a lateral scanning line is a scanning line at a length of 1000 μm perpendicular to the thickness direction of the bonding layer at the cross section, and when the number of plate-shaped particles that form an angle of 45° or more with the lateral scanning line is set as the number of particles β among the plate-shaped particles intersecting with the lateral scanning line, wherein $\alpha > 10$, and $\alpha/\beta > 3$.

2. The honeycomb structure according to claim 1, wherein the plate-shaped particles in the bonding layer contains a particle having a thickness of 1 to 10 μm and a width of 40 to 500 μm at the cross section of the bonding layer cut off to the thickness direction of the bonding layer.

3. The honeycomb structure according to claim 2, wherein the plate-shaped particles in the bonding layer is constituted of at least one kind selected from the group consisting of mica, talc, boron nitride, and glass flake.

4. The honeycomb structure according to claim 3, wherein the plurality of honeycomb segments are constituted of at least one kind selected from the group consisting of silicon carbide, alumina titanate, silicon nitride, and cordierite.

5. The honeycomb structure according to claim 2, wherein the plurality of honeycomb segments are constituted of at least one kind selected from the group consisting of silicon carbide, alumina titanate, silicon nitride, and cordierite.

6. The honeycomb structure according to claim 1, wherein the plate-shaped particles in the bonding layer is constituted of at least one kind selected from the group consisting of mica, talc, boron nitride, and glass flake.

7. The honeycomb structure according to claim 6, wherein the plurality of honeycomb segments are constituted of at least one kind selected from the group consisting of silicon carbide, alumina titanate, silicon nitride, and cordierite.

8. The honeycomb structure according to claim 1, wherein the plurality of honeycomb segments are constituted of at least one kind selected from the group consisting of silicon carbide, alumina titanate, silicon nitride, and cordierite.

\* \* \* \* \*